United States Patent [19]

Behm

[11] 3,895,536

[45] July 22, 1975

[54] APPARATUS FOR AND METHOD OF TESTING FOR PREDETERMINED UNBALANCE OF ELECTRIC MOTOR ROTORS AND THE LIKE

[76] Inventor: Carl M. Behm, 27317 Santa Clara Dr., Westlake, Ohio 44145

[22] Filed: Sept. 9, 1974

[21] Appl. No.: 504,153

[52] U.S. Cl. ................................................ 73/462
[51] Int. Cl.² ........................................ G01M 1/22
[58] Field of Search ........................ 73/66, 462–466; 29/598

[56] References Cited
UNITED STATES PATENTS

| | | | |
|---|---|---|---|
| 2,167,488 | 7/1939 | Ohlson | 73/462 |
| 2,722,465 | 11/1955 | Ellis | 73/66 |
| 2,891,241 | 6/1959 | Fibikar | 73/462 X |

*Primary Examiner*—James J. Gill
*Attorney, Agent, or Firm*—Donnelly, Renner & Otto

[57] ABSTRACT

A testing machine and method for evaluating dynamic unbalance in electric motor rotors and the like characterized in that a rotor having fixed and applied weights at its respective ends 180° apart is mounted on an arbor having a "heavy spot" of predetermined oz. in. magnitude angularly spaced 180° and predeterminedly axially offset from said applied weight, said arbor being provided with bearings at its opposite ends which fit in cradle-like supports of the machine. Said machine has drive means to rotate the arbor and rotor assembly at a predetermined speed about the axis of the rotor. The bearing support adjacent to said "heavy spot" has associated therewith a transducer which through a vibration monitor actuates a visual indicating means such as a meter, go-no go lights, etc. by which it can be determined whether the dynamic unbalance of the rotor-arbor assembly is within or without a predetermined oz. in.² value.

7 Claims, 5 Drawing Figures

APPARATUS FOR AND METHOD OF TESTING FOR PREDETERMINED UNBALANCE OF ELECTRIC MOTOR ROTORS AND THE LIKE

BACKGROUND OF THE INVENTION

Dynamic unbalance-measuring machines as now known are of rather complex construction and are designed to provide information as to the amount and angular location of correction required in each of two selected planes perpendicular to the rotational axis of the rotor or like part which is being tested. Basically, there are three types of machines with which the effective unbalance in one plane of correction may be separately read without influence from the effective unbalance in the other plane of correction i.e. (1) the pivoted cradle type of machine in which the shaft portions of a rotor are supported on a cradle that is carried on a fulcrum in one of the two selected correction planes while unbalance effects in the other correction plane are measured, the rotor then being turned end to end to place the other correction plane in the plane of the fulcrum similarly to determine the unbalance effects in said one selected correction plane; (2) the nodal bar type of machine in which the rotor shaft portions are flexibly supported in bearings, and a nodal bar attached to these bearings has the same motion as the axis of the rotor and if there is unbalance in the rotor in either or both correction planes there will be vibratory motion at the bearings and there will be a nodal or null point or points between the bearings; and (3) the electrical network type in which the rotor shaft bearings have coils attached thereto that are free to move in the fields of permanent magnets and if there is unbalance, the voltage due to vibratory motion of the bearings be greater at one end than the other and an unbalance indicator will show unbalance in either of the selected two planes of correction as a switch causes the indicator to receive voltage from one network or the other.

SUMMARY OF THE INVENTION

In contradistinction to known dynamic balancing machines and methods, the present invention provides a simplified form of machine and method by which electric motor rotors and the like may be quickly and easily tested to determine whether they are within or without the limits set by the specifications.

It is a principal object of this invention to provide a testing machine and method as for a rotor having a fixed weight at one end and an applied weight at the other end 180° from the fixed weight, the rotor being keyed on an arbor which has shaft portions at opposite ends carrying bearings which are supported in cradle-like supports, the arbor having a flange portion adjacent the applied weight which has a "heavy spot" of prescribed oz. in. magnitude spaced 180° and a predetermined axial distance from the applied weight. The machine herein has drive means for rotating the rotor and arbor assembly at a predetermined speed and has transducer means which picks up the vibration at the bearing and transmits a signal through a vibration monitor to an indicator means such as a meter or the like from which it can be determined whether the rotor under test is within or without a specified oz. in.$^2$ limit.

Other objects and advantages will appear from the ensuing description.

DETAILED DESCRIPTION OF A PREFERRED EMBODIMENT

Figure 1:
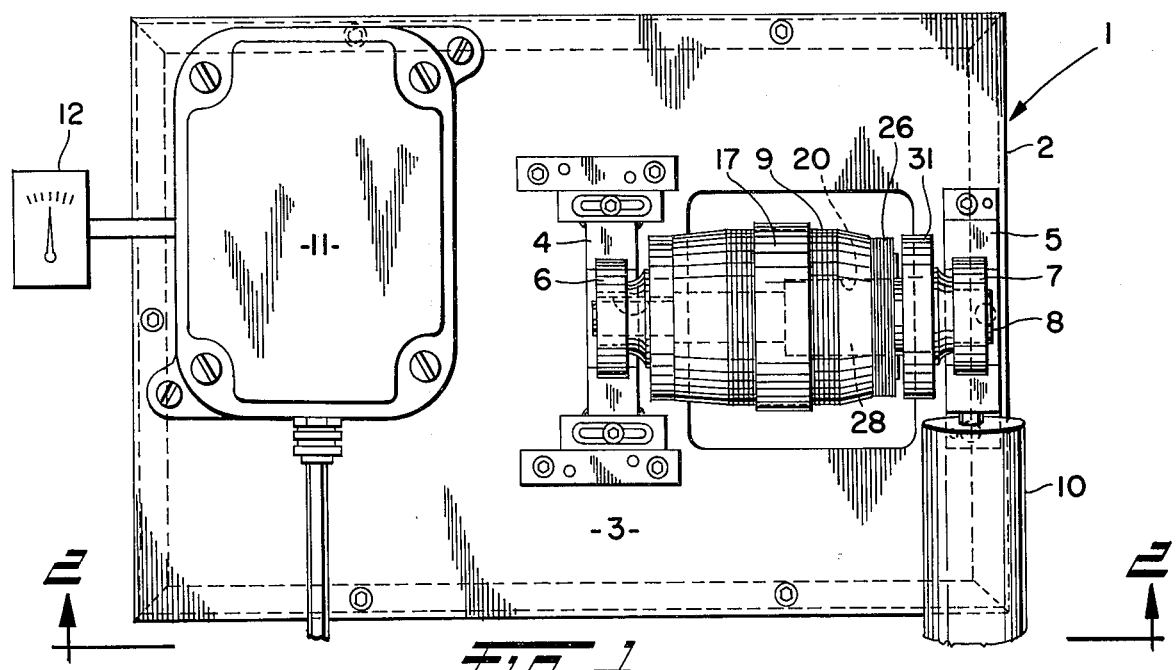
FIG. 1 is a top plan view of a testing machine embodying the present invention.
Figure 2:
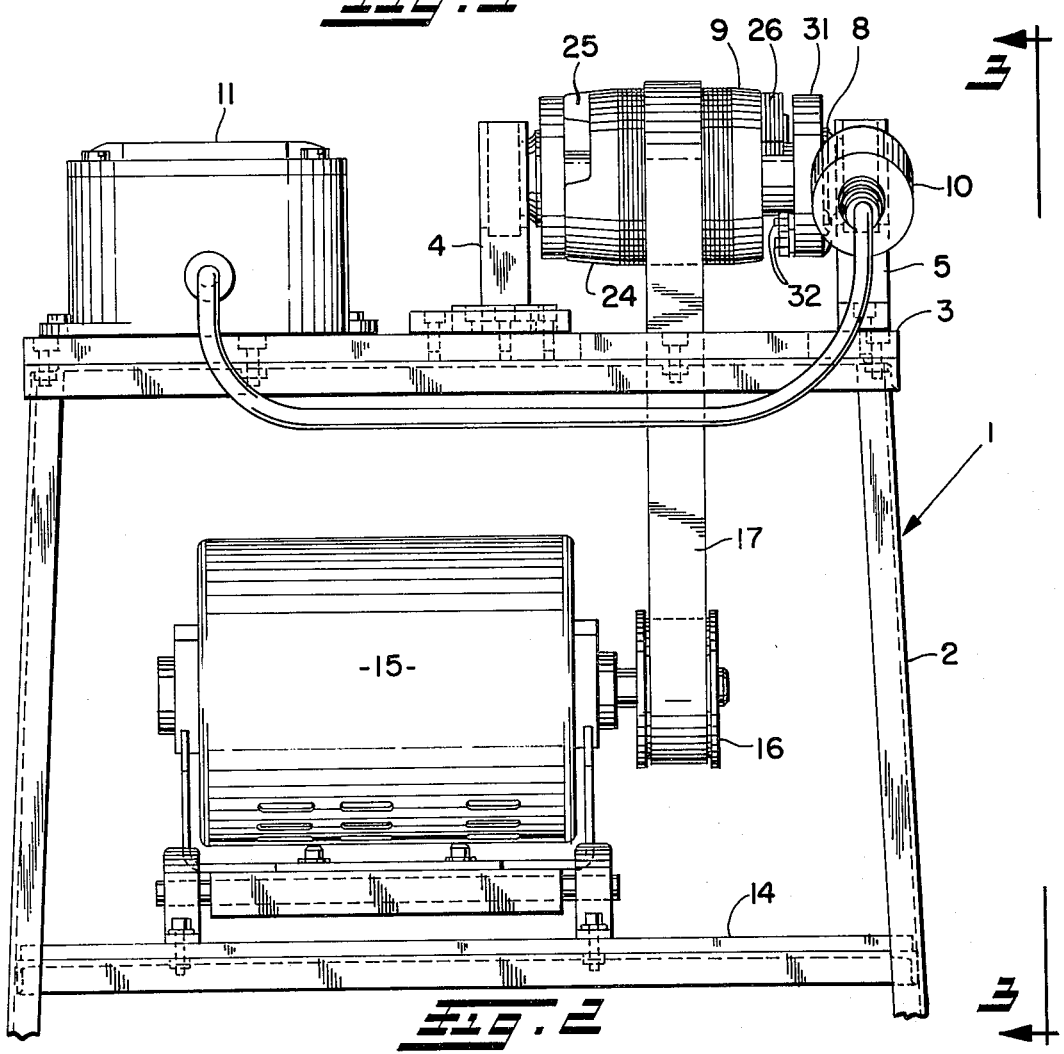
FIG. 2 is a front elevation view as viewed along the line 2—2, FIG. 1.
Figure 3:
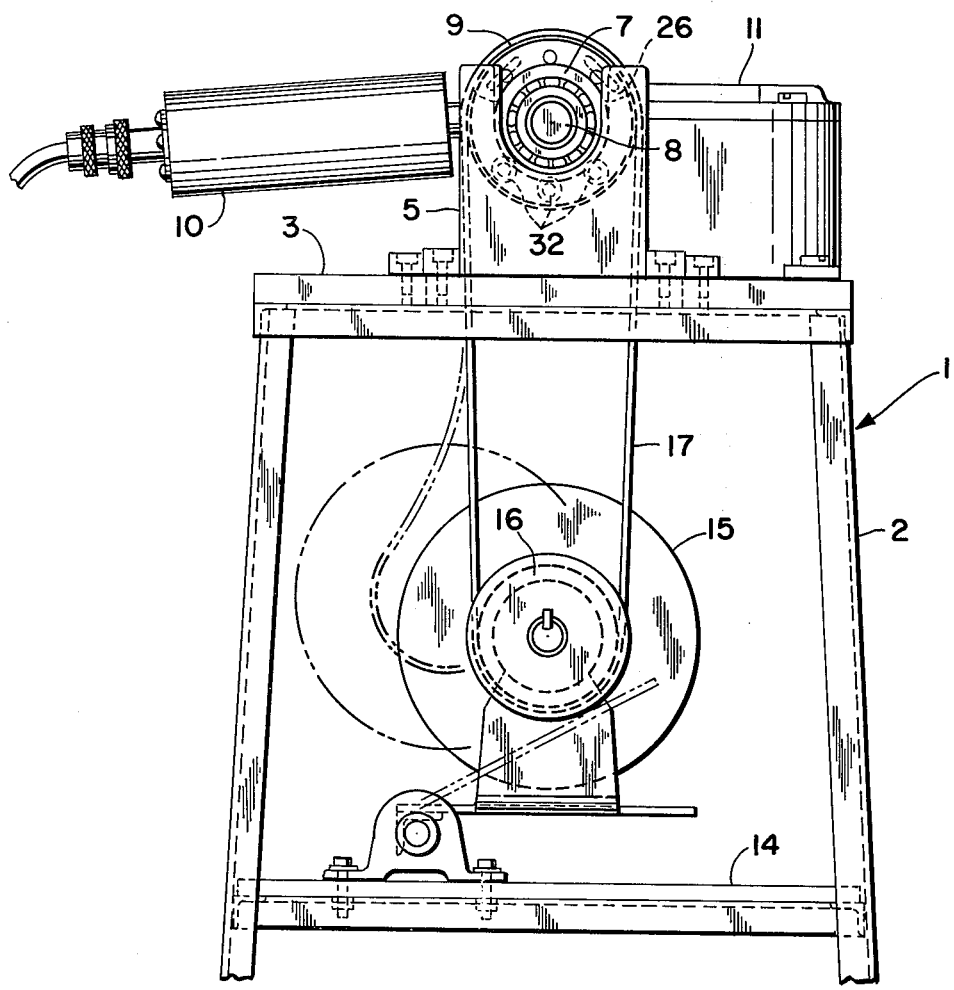
FIG. 3 is a side elevation view as viewed along the line 3—3, FIG. 2.

Referring first to FIGS. 1, 2, and 3 the machine 1 comprises a base or stand 2, the top 3 of which has mounted thereon pedestal or cradle supports 4 and 5 in which the bearings 6 and 7 of the arbor 8 are removably supported in coaxial alignment, the support 4 being adjustable as shown to accommodate different size rotors 9 to be tested.

Mounted on the bearing support 5 to respond to vibratory motion of the arbor bearing 7, when the rotor 9 and arbor 8 assembly are rotated at predetermined angular velocity, is a transducer 10 which may be of any well-known type but which by way of example is herein shown as being of the seismic or induction velocity generator type. By way of illustrative example, the transducer may be of the type manufactured by Reliance Electric Company (Model 4028).

Also mounted on the top 3 of the stand 2 is an electronic vibration monitor 11 which, in turn, is operatively connected to a suitable indicating means 12 which may comprise a meter to indicate whether the dynamic unbalance is within or without a prescribed limit. It is to be understood that any suitable type of indicating means may be employed. It is also contemplated that red and green lights, for example, may be used with the green light when "on" indicating that the rotor under test is within the prescribed limit of unbalance and with the red light when "on" indicating that the rotor under test is outside the prescribed limit of unbalance.

The test stand 2 has a shelf 14 upon which an electric drive motor 15 is supported for pivotal movement as shown, said motor 15 having a drive pulley 16 thereon over which is trained a belt 17 which at its upper end is trained around the rotor 9 thus to drive the rotor 9 and arbor 8 assembly at predetermined speed. Operation of the drive motor 15 may be controlled as by a foot-operated switch (not shown) and when the motor 15 is deenergized after running a test on the rotor 9 it may be swung up to a phantom line position (FIG. 3) to loosen the belt 17 sufficiently that the rotor 9 and arbor 8 assembly may be lifted out of the pedestal supports 4 and 5 for removal of the tested rotor 9 from the arbor 8 and replacement by the next rotor 9 to be tested. Instead of employing a drive means as herein shown it is to be understood that the rotor 9 and arbor 8 assembly may be otherwise driven as from either end of the arbor shaft.

For safety purposes, the top 3 may have hinged thereon a transparent plastic safety cover (not shown) over the rotating rotor 9-arbor 8 assembly and when such cover is swung down it may operate a switch in series with the foot-operated switch aforesaid.

Figure 4:
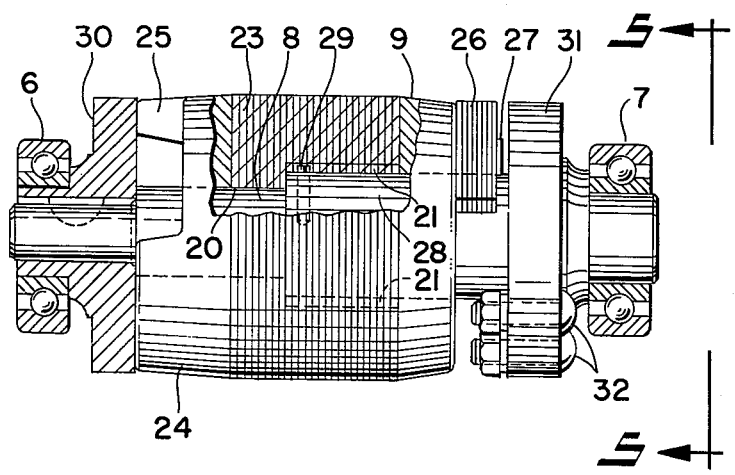
FIG. 4 is a plan view partly in cross-section illustrating the rotor and arbor assembly.
Figure 5:
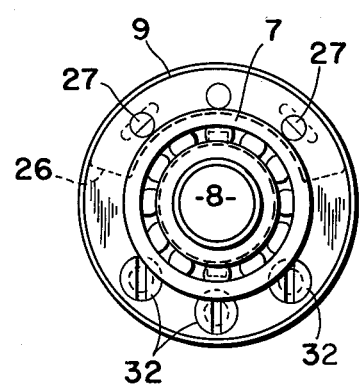
FIG. 5 is an end elevation view as viewed along the line 5—5, FIG. 4.

As best shown in FIGS. 4 and 5, the rotor 9 has a stepped bore 20 therethrough with diametrically opposite keyways 21 preferably of helical form. The rotor 9 has an intermediate laminated iron body portion 23 and has at one end a fixed or integral weight 24 which may be of generally semi-annular form and a plurality of fan blades 25 and has at the other end an applied weight 26 thereon which may be in the form of arcuate laminations fitted onto axially projecting rivet bosses 27 at that end of the rotor and retained on said bosses 27 by mashing the ends of the bosses 27. As shown herein, the applied laminated weight 26 is angularly spaced 180° from the fixed weight.

The arbor 8 as best shown in FIGS. 4 and 5 comprises a stepped shaft portion 28 which fits closely in the stepped bore 20 of the rotor 9 and the arbor shaft portion 28 has one or two dowel pins 29 engaged in one or both keyways 21 of the rotor 9 so that the arbor 8 and rotor 9 will be rotated in unison The end of the arbor 8 which extends through the small bore of the rotor 9 has slidably keyed thereon a bearing support plate 30 which engages the fixed weight 24 and fan 25 end of the rotor 9 to retain the rotor 9 on the arbor 8 without axial play when the bearings 6 and 7 are positioned in the cradles of the pedestal supports 4 and 5. The other end of the arbor 8 provides a mounting for the bearing 7, and between said bearing 7 and the applied weight 26 of the rotor 9, the arbor 8 has a flange 31 to which weights 32 in the form of screw-washer-nut assemblies are secured to provide a "heavy spot" of prescribed oz. in. static unbalance which is located 180° from the applied weight 26 and at a radius and axial location such that when the rotor-arbor assembly is rotated at prescribed speed, the dynamic unbalance of the assembly will be of prescribed oz. in.$^2$ magnitude provided that the rotor 9 itself meets required specifications.

In the present case, instead of creating the specified "heavy spot" on the flange 31 by a single weight 32 angularly spaced 180° from the applied weight 26 it was deemed desirable to use, for example, three sets of screws, washers, and nuts located to have the same effect as a single weight to produce the prescribed oz. in. static unbalance and the prescribed oz. in.$^2$ dynamic unbalance. If desired, the rotor balancing device of U.S. Pat. No. 3,272,015 may be employed to determine the angular spacing of the weights 32 to achieve the required "heavy spot". In some sizes of rotors 9, it has been found desirable to employ four sets of weights 32 using longer screws with two nuts thereon to produce the required static and dynamic unbalance.

In any event, when the vibration monitor 11 is set for a particular rotor 9, the driving thereof at the prescribed speed should produce the specified dynamic unbalance of X oz. in.$^2$ and, as previously mentioned, the indicating means 12 may comprise a meter as shown which will indicate whether or not the rotor 9 is acceptable. Also, as previously mentioned, green and red lights may be used to provide a visual indication that the rotor under test is within the prescribed limits by the lighting of the green light and outside the prescribed limits by the lighting of the red light.

The embodiments of the invention in which an exclusive property or privilege is claimed are defined as follows:

1. A machine for dynamically testing tubular electric motor rotors of the like of the type having fixed and applied weights at its respective axial end portions angularly spaced apart 180°; said machine comprising a stand having coaxial bearing support members; an arbor for non-rotatably mounting such rotor thereon between bearings on said arbor engaged in said bearing support members; drive means on said stand for driving said arbor and thus said rotor at predetermined angular velocity; said arbor having a heavy spot of selected oz. in. magnitude axially offset from and angularly spaced 180° from said applied weight to decrease the static unbalance of said rotor-arbor assembly to within a prescribed oz. in. limit in connection with a rotor which meets manufacturing specifications therefor and to substantially dynamically balance said rotor-arbor assembly to within a prescribed oz. in.$^2$ limit when said rotor-arbor assembly is driven by said drive means; transducer means on one bearing support producing a signal proportional to the magnitude of dynamic unbalance responsive to the vibration of the associated bearing in said one bearing support; vibration monitor means operatively connected to said transducer means; and indicating means operatively connected to said monitor effective to indicate whether or not said rotor-arbor assembly is within such prescribed oz. in.$^2$ dynamic unbalance limit.

2. The machine of claim 1 wherein said bearing support members are cradle-like from which said rotor-arbor assembly may be laterally removed.

3. The machine of claim 1 wherein said drive means comprises an electric drive motor on said stand having a drive belt trained over the peripheral surface of the rotor.

4. The machine of claim 3 wherein said drive motor is pivotally mounted to provide slack in said belt; and wherein said bearing support members are cradle-like from which the rotor-arbor assembly may be laterally withdrawn when there is slack in said belt as aforesaid.

5. The machine of claim 1 wherein said arbor has a flange adjacent to said applied weight; and wherein said heavy spot is on said flange.

6. The machine of claim 5 wherein said heavy spot comprises a plurality of angular spaced-apart screw assemblies on said flange.

7. A method of dynamically testing a tubular electric motor rotor or the like of the type having fixed and applied weights at its respective axial end portions angularly spaced apart 180°; coaxially and non-rotatably supporting said rotor on an arbor; adding weight to said arbor to produce a heavy spot of prescribed oz. in. magnitude axially offset from said applied weight and angularly spaced 180° from said applied weight; rotating the rotor-arbor assembly at predetermined angular velocity; said heavy spot, during rotation of said rotor-arbor assembly, dynamically balancing said rotor-arbor assembly within a prescribed oz. in.$^2$ dynamic unbalance limit when the rotor under test meets specifications therefor; and observing, during rotation of said assembly, the magnitude of dynamic unbalance for approval or disapproval of the rotor under test.

* * * * *